United States Patent
Jadaud

(10) Patent No.: US 7,760,983 B2
(45) Date of Patent: Jul. 20, 2010

(54) DISTRIBUTION CABLE TRAY WITH A CLAMPING COLLAR RECEIVER DEVICE

(75) Inventor: Alain Jadaud, Tennie (FR)

(73) Assignees: Legrand France, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 11/482,874

(22) Filed: Jul. 10, 2006

(65) Prior Publication Data
US 2007/0009220 A1 Jan. 11, 2007

(30) Foreign Application Priority Data
Jul. 11, 2005 (FR) .................................. 05 07375

(51) Int. Cl.
*G02B 6/00* (2006.01)
*F16L 3/00* (2006.01)
*F16L 3/08* (2006.01)
*F16L 3/12* (2006.01)

(52) U.S. Cl. .......................... 385/135; 385/134; 248/62; 248/74.1

(58) Field of Classification Search ......... 385/134–137; 348/62, 73.1
See application file for complete search history.

(56) References Cited

U.S. PATENT DOCUMENTS

| 6,298,191 | B1 * | 10/2001 | Daoud | 385/137 |
| 2003/0086673 | A1 * | 5/2003 | Zah et al. | 385/136 |
| 2003/0086675 | A1 * | 5/2003 | Wu et al. | 385/137 |
| 2004/0013387 | A1 * | 1/2004 | Wakileh et al. | 385/134 |
| 2004/0052493 | A1 * | 3/2004 | Lavoie | 385/137 |
| 2006/0198593 | A1 * | 9/2006 | Ivancevic | 385/135 |

FOREIGN PATENT DOCUMENTS

| EP | 1 113 552 A | 7/2001 |
| EP | 1 113 552 A1 * | 7/2001 |
| FR | EP 0 813 012 B1 * | 2/2000 |
| IT | EP 1 113 552 A1 * | 4/2001 |
| IT | EP1113552 A1 * | 4/2001 |
| IT | EP 1 113 552 A1 * | 7/2001 |

* cited by examiner

*Primary Examiner*—Uyen-Chau N Le
*Assistant Examiner*—Kajli Prince
(74) *Attorney, Agent, or Firm*—Young & Thompson

(57) ABSTRACT

The invention relates to a distribution cable tray including at least one receiver device for receiving a clamping collar for clamping cables or conductors extending in the base of said cable tray. According to the invention, the receiver device comprises a pair of opposite directions, together defining a reception housing for said clamping collar.

8 Claims, 2 Drawing Sheets

DISTRIBUTION CABLE TRAY WITH A CLAMPING COLLAR RECEIVER DEVICE

TECHNICAL FIELD TO WHICH THE INVENTION RELATES

In general manner, the present invention relates to cable trays of the type used, for example, for supporting, housing, and protecting conductors, pipes, or other equipment needed for serving appliances, in particular electrical appliances.

More particularly, the invention relates to a distribution cable tray comprising at least one receiver device for receiving a clamping collar for clamping cables or conductors extending in the base of said cable tray.

A particularly advantageous application of the invention lies in making an electric cable tray of small thickness in which the base is obtained by extruding a plastics material that tends to soften when the electric cables extending in said base reach their maximum operating temperatures.

Nevertheless, the invention can also be applied to any type of section member receiving electrical conductors, such as service trunks or cable troughs, for example.

TECHNOLOGICAL BACKGROUND

Distribution cable trays of the above-specified type are already known, in particular from documents FR 2 719 167, EP 1 113 552, and EP 0 554 702, in which the clamping collar receiver device is an accessory or a cutout in the form of a bridge defining a strap on a wall of the base of the cable tray through which the clamping collar can be threaded.

Nevertheless, threading a clamping collar under a receiver strap is an operation that an installer finds difficult to perform on a worksite.

Furthermore, the use of a receiver accessory for fitting to the cable tray base presents a certain amount of extra cost in terms of fabricating and positioning said accessory.

Electrical distribution cable trays are also known from documents DE 43 44 144, ES 1 057 705 U, FR 2 749 914, EP 0 813 012, and WO 2004/049531, in which the clamping collar receiver device is a simple hook or catch finger formed in or fitted to a wall of the cable tray base.

Such devices for receiving a clamping collar merely by hooking can allow a clamping collar clamped around conductors or cables to escape and cannot provide good mechanical opposition against said collar being pulled out.

In addition, the electrical cable installer needs to take account of the direction in which the hooks are pointing when positioning the bases of such distribution cable trays, so as to ensure that the hooks do not face downwards.

OBJECT OF THE INVENTION

In order to remedy the drawbacks of the above-mentioned state of the art, the present invention provides a cable tray as defined in the introduction, in which the receiver device comprises a pair of hooks projecting from a wall of said base, the hooks being open in opposite directions, and together defining a reception housing for said clamping collar.

Thus, inserting the clamping collar in a pair of hooks of a cable tray of the invention is an operation that is simple for an installer to implement on a worksite.

Furthermore, the two-hook receiver device of the invention provides good retention of a collar that is clamped around conductors or cables and provides good mechanical opposition against said collar being pulled out.

Other characteristics of the cable tray of the invention that are non-limiting and are advantageous, are as follows:

- the two hooks are positioned head-to-tail, side-by-side;
- the two hooks are offset relative to each other in the direction of their openings such that the free end of one hook extends beyond the back of the other hook;
- the two hooks are offset laterally relative to each other by a distance that is substantially equal to the width of said clamping collar, ignoring clearance;
- the two hooks are disposed facing each other;
- the two hooks present parallel free end edges that extend at an angle relative to the direction in which said hooks extend;
- the hooks extend along the longitudinal axis of the base of the cable tray;
- the hooks extend along the transverse axis of the base of the cable tray;
- the hooks are formed integrally with the base of the cable tray by extruding a plastics material;
- a plurality of pairs of hooks are provided on said wall of the base of the cable tray;
- each pair of hooks is positioned on a bottom web of said base; and
- each pair of hooks is positioned on a side flange of the base.

BRIEF DESCRIPTION OF THE DRAWINGS

In the accompanying drawings

DETAILED DESCRIPTION OF THE PREFERRED EMBODIMENTS

Figure 1:
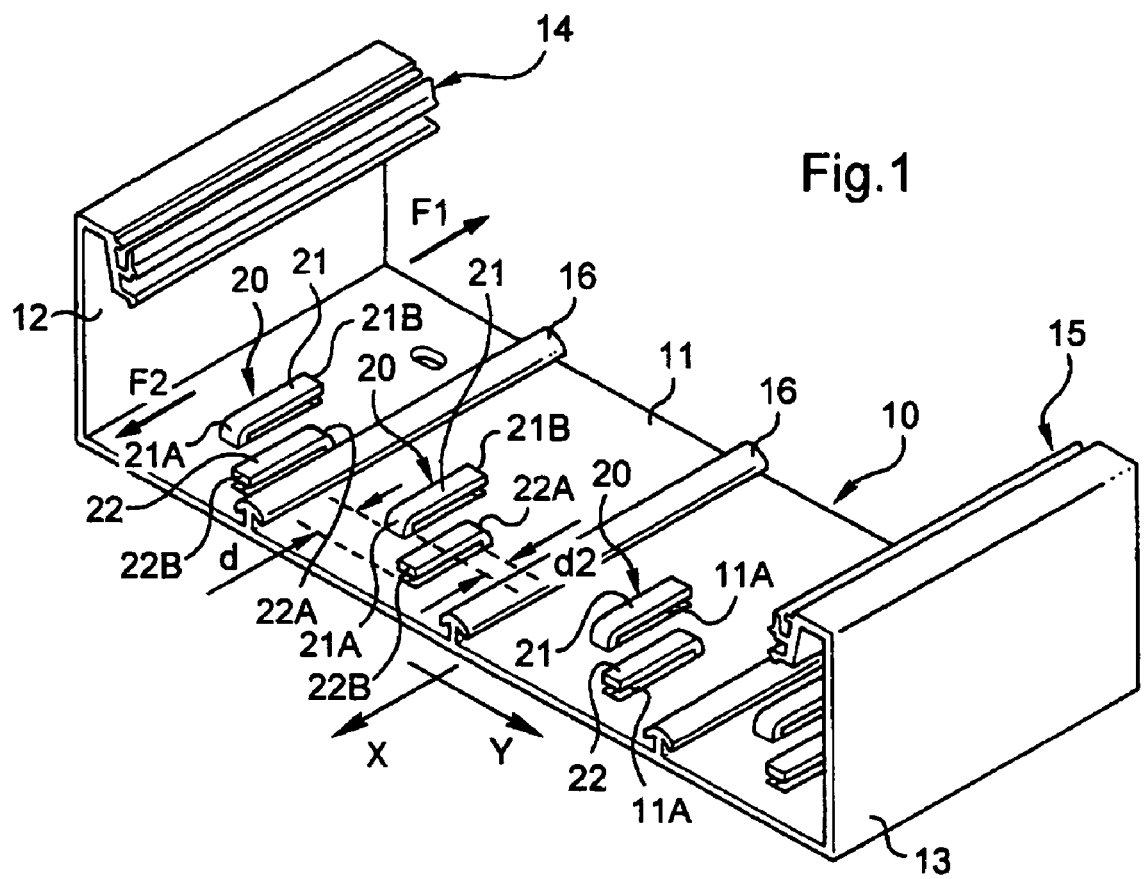
FIG. 1 is a diagrammatic perspective view of a base of a first embodiment of a cable tray of the invention.
Figure 2:
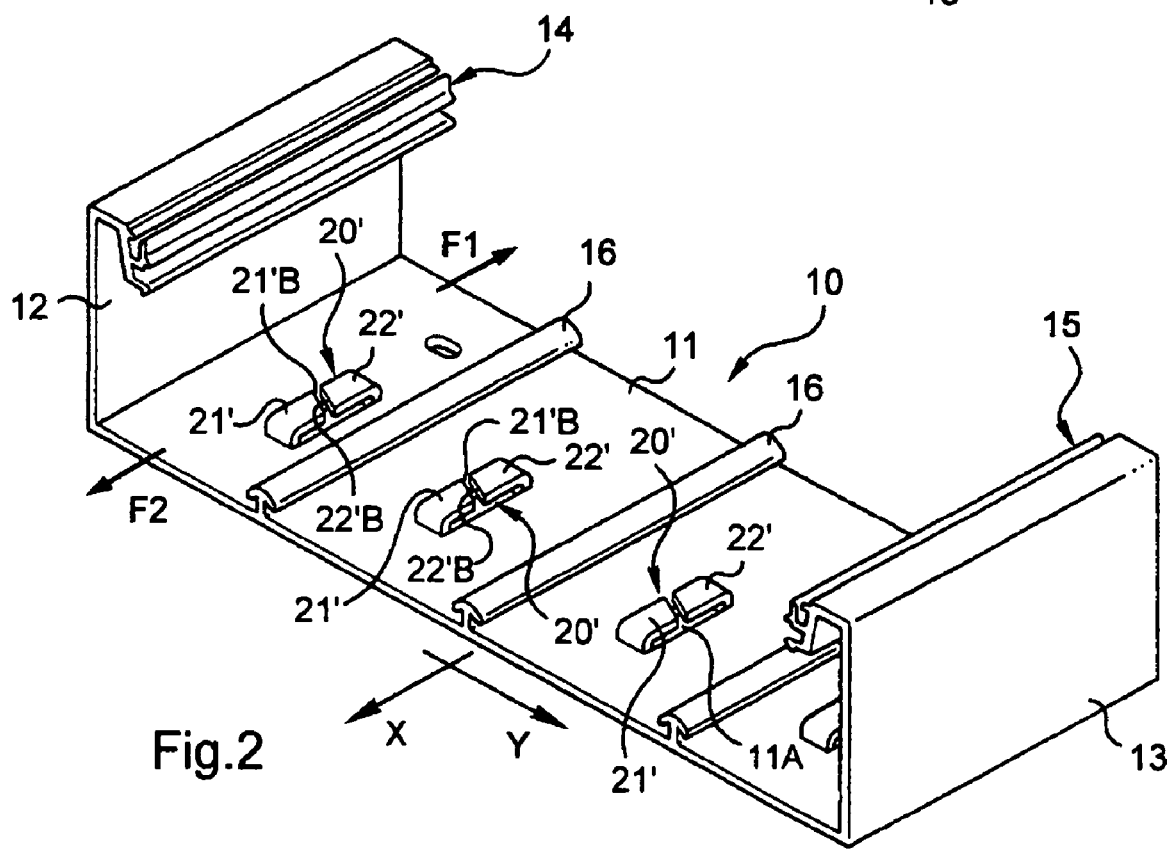
FIG. 2 is a diagrammatic perspective view of a base of a second embodiment of a cable tray of the invention.
Figure 3:
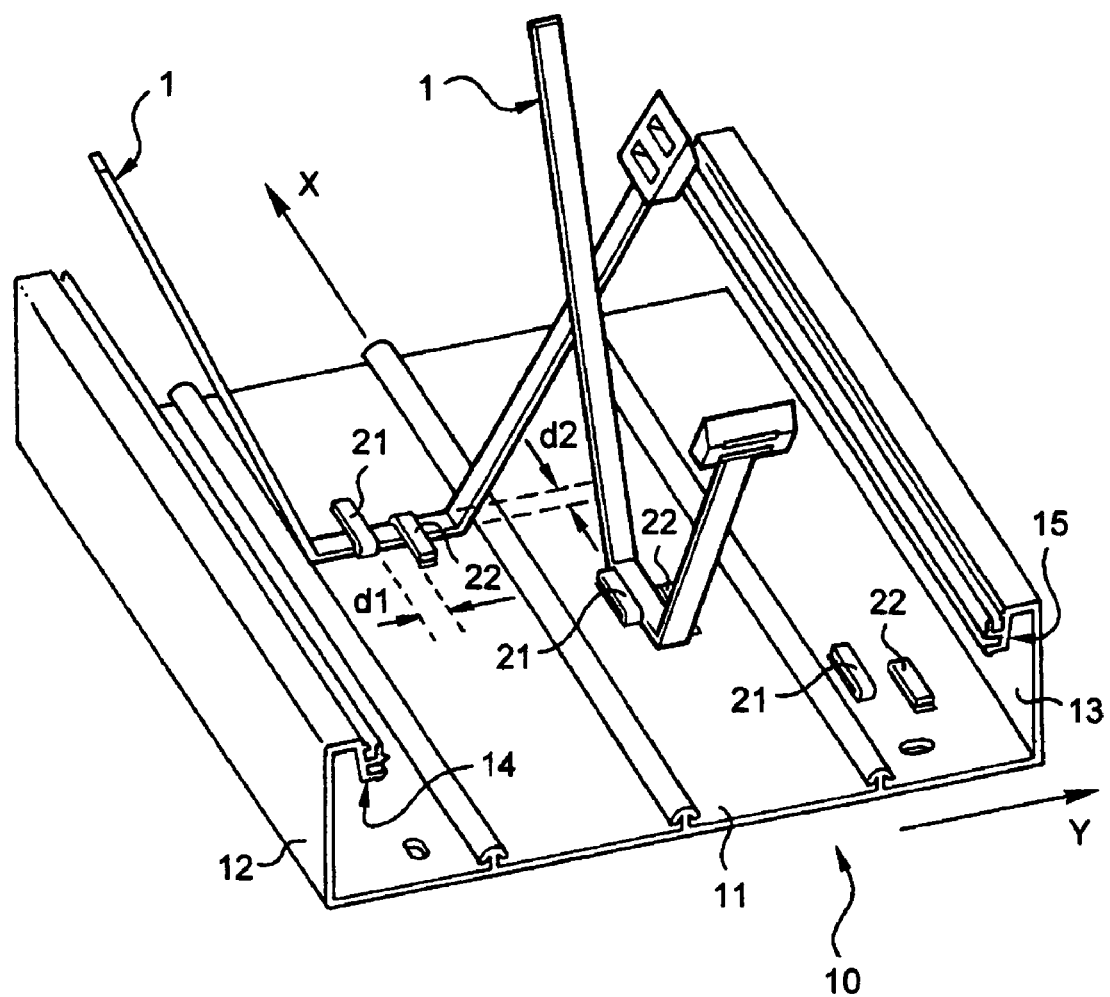
FIG. 3 is a perspective view of the FIG. 1 base showing a clamping collar being put into place in the receiver device.

FIGS. 1 to 3 show two embodiments of an electricity distribution cable tray comprising a channel-section base 10 having a web 11 from which two parallel side flanges 12, 13 extend perpendicularly.

On either side of the web 11, the tips of the side flanges 12, 13 carry rims that are provided with fastener means 14, 15 for engaging a closure cover (not shown) for closing the longitudinal opening of said base.

In addition, and in conventional manner, the web 11 of the base 10 carries on the inside face of the web 11, ribs 16 extending parallel to the longitudinal axis X of said base for the purpose of snap-fastening a partition for subdividing or separating the inside space of the base.

The distribution cable tray shown in the figures advantageously includes at least one receiver device 20, 20' for receiving a collar 1 for clamping conductors or cables extending in the base 10 of said cable tray.

Projecting from a wall of the base 10, the receiver device 20, 20' comprises a pair of hooks 21, 22; 21', 22' that are open in opposite directions F1, F2 defining a housing for receiving a said clamping collar.

In the two embodiments shown in FIGS. 1 and 2, there are provided a plurality of receiver devices 20; 20', i.e. a plurality of pairs of hooks 21, 22; 21', 22' disposed on the inside face of the web 11 of the base 10 and distributed along the longitudinal axis X and also along the transverse axis Y of said base over the entire width thereof.

In the examples shown, a receiver device 20; 20' is provided between each side flange 12, 13 of the base 10 and a rib 16, and between any two juxtaposed parallel ribs 16.

In this manner, it is possible advantageously to secure to the web 11 of the base 10 one or more clamping collars 1 at any position along the length and/or the width of the base 10 in order to bundle together electrical conductors or cables.

In the embodiment shown in FIGS. 1 and 3, the two hooks 21, 22 of a pair constituting a receiver device 20 are preferably disposed head-to-tail, side-by-side (facing in opposite directions) along the longitudinal axis X of the base 10. They are formed integrally with the web 11 of the base 10 by extruding a plastics material and then by cutting out and folding the extruded material, and beneath each hook 21, 22 and in register therewith, there is provided an opening 11A through the web 11 of the base 10.

The two hooks 21, 22 in a given pair are offset relative to each other by a distance d in the direction of their openings, i.e., in this case along the direction of the X axis, so that the free end 21B of one hook 21 of a pair extends in the direction F1 of the opening of said hook 21 beyond the back 22A of the other hook 22, while the free end 22B of the other hook 22 of said pair extend in the direction F2 of the opening of said hook 22 beyond the back 21A of the first hook 21 of said pair.

This disposition advantageously makes it easier to introduce the clamping collar 1 into the reception housing defined by the two hooks 21, 22 of said pair.

In addition, as shown in FIG. 3, the two hooks 21, 22 of a given pair are offset laterally (along the Y axis) relative to each other by a distance d1 that is substantially equal to the width of the widest of said clamping collars 1 (ignoring clearance).

The two hooks are positioned head-to-head, side-by-side, and they are offset laterally relative to each other by a distance d2 that is substantially equal to the distance which separates the two backs of the hooks in the longitudinal direction.

A clamping collar 1 is put into place in the hooks 21, 22 of a given pair in a manner that is shown more particularly in FIG. 3.

Firstly, the installer positions the clamping collar 1 along the X axis between the two hooks 21, 22, and then pivots the clamping collar 1 through one-fourth of a turn so as to insert it into the reception housing defined under each of the hooks 21, 22.

The hooks 21, 22 then hold the clamping collar 1 securely, which now extends along the X axis so that it can subsequently no longer escape from the hooks.

This embodiment is particularly adapted to making an electric cable tray of small thickness having a face that is obtained by extruding a plastics material with the hooks, such a base tending to soften when the electrical cables extending therealong reach maximum operating temperatures.

FIG. 2 shows another embodiment in which the hooks 21', 22' of a given pair 20' are disposed facing each other on the web 11 of the base 10.

In this case they likewise extend along the longitudinal X axis of the base 10.

They are also formed together with the web 11 of the base 10, and an opening 11A is provided through the web 11 of said base 10 under and in register with the hooks 21', 22'.

The hooks 21', 22' in a given pair present parallel free end edges 21'B, 22'B that extend at an angle relative to the direction X in which said hook extends.

The direction of the angle of the end edges of the facing hooks 21', 22' is designed to make it easier to insert the clamping collar 1 in the reception housing defined beneath said hook.

The two hooks 21', 22' of a given pair 20' can be made, for example, by making a saw cut through the central portion of a bridge or strap made by cutting out in the web 11 of the base 10. The saw cut extends along a direction lying in the range 90° to 45° relative to the longitudinal X axis of the base 10.

The installer inserts a clamping collar into the slot defined between the two free end edges 21'B, 22'B of the hooks 21', 22' so that said clamping collar is engaged in the hooks 21', 22' while it is extending along the angle of said free end edges 21'B, 22'B. The installer then pivots said clamping collar, while positioned in said hooks 21', 22', so that it becomes positioned along the transverse Y axis of the base 10.

The invention is not limited in any way to the embodiments described and shown, and the person skilled in the art will know how to apply any variation in accordance with its spirit.

For example, provision can be made for the hooks of the receiver device of the cable tray of the invention to extend along the transverse axis of the web of the cable tray and for them to be provided in the inside face of one of said side flanges of said base.

What is claimed is:

1. A distribution cable tray comprising at least one receiver device for receiving a clamping collar for clamping cables or conductors extending in the base of said cable tray, wherein the receiver device comprises a pair of elongated hooks (21, 22) projecting from a wall of said base, each hook comprising a back (21A, 22A) fastened to said wall of said base and terminating in a free end (21B, 22B) spaced above said wall of said base, the two hooks being open in opposite directions and being positioned side-by-side and spaced laterally from each other by a distance (d1, FIG. 3) that is substantially equal to a distance (d2, FIG. 1) which separates the two backs of said hooks in the longitudinal direction (x) of the elongated hooks, in order to define together a reception housing for said clamping collar.

2. A cable tray according to claim 1, wherein the two hooks are offset relative to each other in the direction (x) of their openings such that the free end of one hook extends beyond the back of the other hook (d, FIG. 1).

3. A cable tray according to claim 1, wherein the hooks extend along the longitudinal axis of the base of the cable tray.

4. A cable tray according to claim 1, wherein the hooks extend along the transverse axis of the base of the cable tray.

5. A cable tray according to claim 1, wherein the hooks are formed integrally with the base of the cable tray.

6. A cable tray according to claim 1, wherein a plurality of pairs of hooks are provided on said wall of the base of the cable tray.

7. A cable tray according to claim 1, wherein each pair of hooks is positioned on a bottom web of said base.

8. A cable tray according to claim 1, wherein each pair of hooks is positioned on a side flange of the base.

* * * * *